United States Patent
Goethals et al.

(10) Patent No.: US 12,360,540 B2
(45) Date of Patent: Jul. 15, 2025

(54) COMPRESSOR DEVICE AND METHOD FOR CONTROLLING SUCH COMPRESSOR DEVICE

(71) Applicant: ATLAS COPCO AIRPOWER, NAAMLOZE VENNOOTSCHAP, Wilrijk (BE)

(72) Inventors: Anton Jan Goethals, Wilrijk (BE); Stijn Johan Edmond Broucke, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 312 days.

(21) Appl. No.: 18/025,331

(22) PCT Filed: Sep. 9, 2021

(86) PCT No.: PCT/IB2021/058185
§ 371 (c)(1),
(2) Date: Mar. 8, 2023

(87) PCT Pub. No.: WO2022/053956
PCT Pub. Date: Mar. 17, 2022

(65) Prior Publication Data
US 2023/0324934 A1    Oct. 12, 2023

(30) Foreign Application Priority Data
Sep. 11, 2020  (BE) .................................. 2020/5629

(51) Int. Cl.
G05D 23/19    (2006.01)
(52) U.S. Cl.
CPC ..... *G05D 23/1917* (2013.01); *G05D 23/1931* (2013.01)

(58) Field of Classification Search
CPC ............ G05D 23/1917; G05D 23/1931; F04C 11/001; F04C 15/0096; F04C 29/04
(Continued)

(56) References Cited

U.S. PATENT DOCUMENTS 11,371,507 B2 *   6/2022   Broucke ............... F04B 25/005
11,519,412 B2 *  12/2022   Broucke ................. F04C 18/16
(Continued)

FOREIGN PATENT DOCUMENTS

CN    110925208 A    3/2020
CN    216278335 U    4/2022
(Continued)

OTHER PUBLICATIONS

Belgium Search Report for 202005629 dated, Jan. 21, 2021.
(Continued)

*Primary Examiner* — Raheena R Malik
(74) *Attorney, Agent, or Firm* — Sughrue Mion, PLLC

(57) ABSTRACT

Compressor device comprising an oil-injected compressor element (2) with an outlet (4) connected via an outlet line (8) to an oil separator (9) which is connected via an injection pipe (10) to the compressor element (2), wherein controllable cooling means (15) for the oil are provided, the compressor device (1) being provided with a control unit (21) and thereto connected measuring means (22a, 22b) for controlling the cooling means (15) to control a temperature (T_uit_afsch) downstream of the oil separator (9), the measuring means (22a, 22b) including means (22a) for determining a temperature (T_uit) at the outlet (4) and a temperature sensor (22b) for determining the temperature (T_uit_afsch) downstream of the oil separator (9), the control unit (21) including a controller (25) for controlling the cooling means (15) on the basis of signals from said measuring means (22a, 22b) and on the basis of a dew point.

12 Claims, 2 Drawing Sheets

Figure 1:
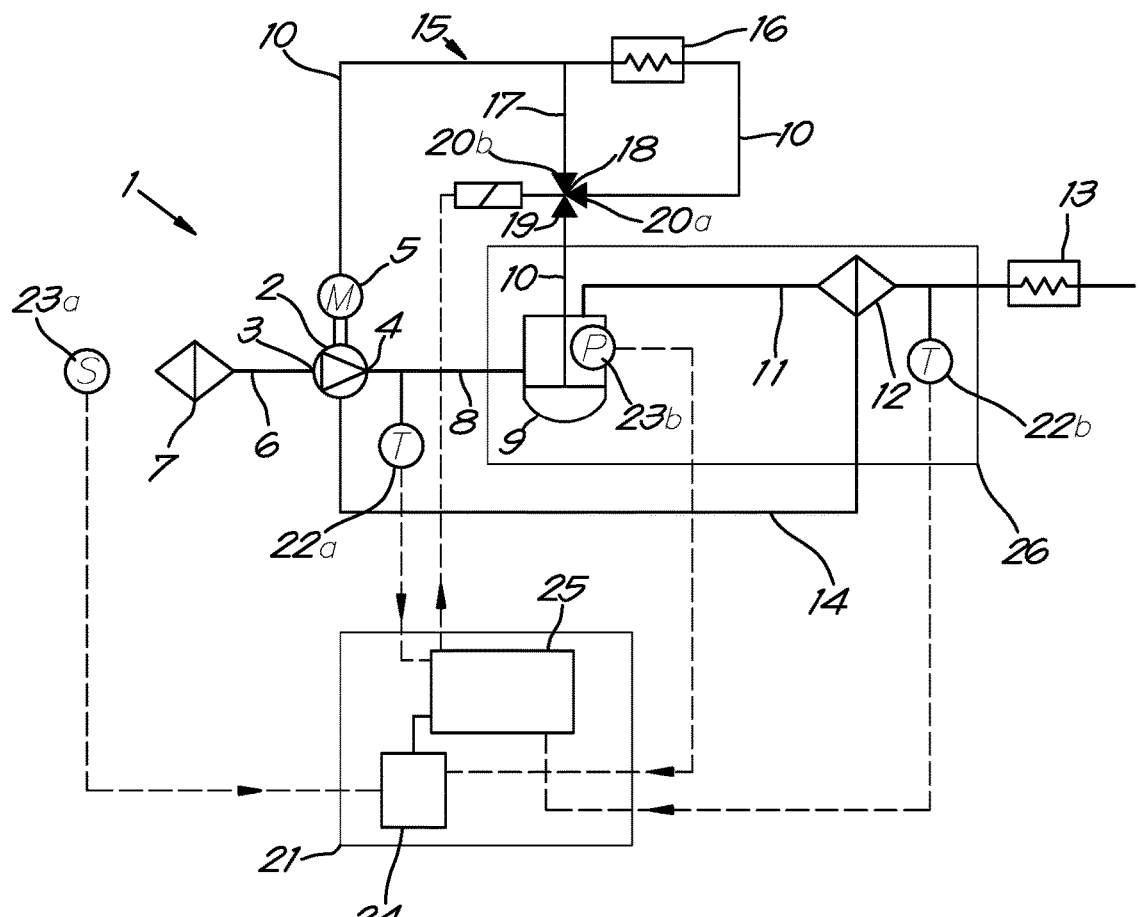

(58) Field of Classification Search
USPC .......................................................... 165/28
See application file for complete search history.

(56) References Cited

U.S. PATENT DOCUMENTS

| | | | | |
|---|---|---|---|---|
| 12,018,678 | B2* | 6/2024 | Broucke | ............. F04C 29/0085 |
| 2002/0020175 | A1* | 2/2002 | Street | ................. G05D 23/1917 |
| | | | | 62/132 |
| 2019/0242382 | A1 | 8/2019 | Kotani et al. | |
| 2020/0158112 | A1 | 5/2020 | Feiler | |
| 2021/0246900 | A1* | 8/2021 | Broucke | ............... F04C 29/028 |
| 2021/0324858 | A1* | 10/2021 | Broucke | ................. F04C 18/16 |
| 2021/0348606 | A1* | 11/2021 | Broucke | ................. F04C 28/02 |
| 2023/0324934 | A1* | 10/2023 | Goethals | ............ G05D 23/1917 |
| | | | | 165/288 |

FOREIGN PATENT DOCUMENTS

| | | |
|---|---|---|
| EP | 1 223 344 A1 | 7/2002 |
| EP | 3 194 784 B1 | 9/2020 |
| WO | 2018/033827 A1 | 2/2018 |
| WO | 2019/174239 A1 | 9/2019 |
| WO | 2022/053956 A1 | 3/2022 |

OTHER PUBLICATIONS

International Search Report for PCT/IB2021/058185 dated, Oct. 21, 2021 (PCT/ISA/210).
Written Opinion of the International Searching Authority dated, Oct. 21, 2021 (PCT/ISA/237).
International Preliminary Report on Patentability for PCT/IB2021/058185 dated, Sep. 23, 2022 (PCT/IPEA/409).
Translation of communication dated Dec. 31, 2024 in Chinese Application No. 202111061291.1.

* cited by examiner

COMPRESSOR DEVICE AND METHOD FOR CONTROLLING SUCH COMPRESSOR DEVICE

CROSS REFERENCE TO RELATED APPLICATIONS

This application is a National Stage of International Application No. PCT/IB2021/058185 filed Sep. 9, 2021, claiming priority based on Belgium Patent Application No. 2020/5629 filed Sep. 11, 2020.

The present invention relates to a compressor device comprising an oil-injected compressor element with an inlet for gas to be compressed and an outlet for compressed gas, wherein the outlet connects to an oil separator connected by means of an injection line to said compressor element for an injection of oil, said injection line including a cooler which can be bypassed by means of a bypass line, wherein a controlled mixing valve with an inlet and two outlets is provided, the mixing valve having its inlet and one of the outlets connected to the injection line and the other outlet connected to the bypass line, the compressor device further being provided with a control unit for controlling the mixing valve.

From US2009/252632, US2020/158112 or EP3194784 devices are known in which the control unit will control the mixing valve to prevent condensate from forming in the compressed gas by controlling the temperature of the oil being injected.

In this regard, the control unit will determine a dew point at the outlet of the compressor element on the basis of environmental parameters such as temperature, pressure and humidity, and on the basis of the pressure at the outlet.

The mixing valve will then be controlled by the control unit in such a way that the temperature at the outlet lies above this dew point.

A temperature several degrees above the dew point is usually taken as the control temperature for the temperature at the outlet.

A disadvantage of such an approach is that the temperature of the gas after the oil separator will drop, so that it will get below the dew point and thus condensate can occur in the compressed gas downstream of the oil separator, but also upstream of a thereto subsequent filter that will separate the last oil from the compressed gas.

This is undesirable, since avoiding the occurrence of condensate is desirable at all times before all the oil has been separated from the compressed gas.

Therefore, said control temperature must be set sufficiently high above the dew point, typically 20° C., whereas actually a much lower setting would be desirable.

After all, the higher the temperature, the shorter the lifetime of the oil and the lower the efficiency of the compressor device.

Controlling that the temperature of the compressed gas downstream of the oil separator lies above the dew point, rather than controlling the temperature at the outlet of the compressor element, offers no solution, since such control takes effect much too late and leads to instabilities.

This invention aims at solving at least one of the aforementioned and other disadvantages.

The present invention has as its object a compressor device comprising an oil-injected compressor element having an inlet for gas to be compressed and an outlet for compressed gas, wherein the outlet is connected via an outlet line to an oil separator connected by an injection line to said compressor element for an injection of oil, wherein controllable cooling means for the oil are provided, the compressor device further having a control unit and thereto connected measuring means for controlling the cooling means to control a temperature $T\_uit\_afsch$ of the compressed gas downstream of the oil separator, characterized in that the measuring means include means for determining a temperature $T\_uit$ of the compressed gas at the outlet and a temperature sensor for determining the temperature $T\_uit\_afsch$ of the compressed gas downstream of the oil separator, the control unit containing a controller for controlling the cooling means on the basis of signals from the means and the temperature sensor and on the basis of a dew point of the compressed gas.

An advantage is that, by control on the basis of both the temperature $T\_uit$ of the compressed gas at the outlet and the temperature $T\_uit\_afsch$ of the compressed gas downstream of the oil separator, controlling taking place on the temperature $T\_uit\_afsch$ downstream of the oil separator and using the temperature $T\_uit$ at the outlet for adjustment, control will be more stable.

By "controlling taking place on" is meant that this temperature will be controlled to the dew point.

Another advantage is that by effectively controlling the temperature $T\_uit\_afsch$ of the compressed gas downstream of the oil separator, the temperature of the oil can be kept as low as possible with no or only a very low safety margin to avoid condensate at this location.

The means for determining the temperature $T\_uit$ of the compressed gas at the outlet can, for example, be a temperature sensor or a pressure sensor which measures the pressure at the outlet. After all, this temperature $T\_uit$ can also be determined on the basis, for example, of the pressure at the outlet.

In a practical form of embodiment, the controller of said control unit comprises a feed-forward control that will calculate a corrected temperature set point $T\_set\_corr$ on the basis of the temperature $T\_uit$ and the dew point of the compressed gas, which is used by a controller to control the cooling means on the basis of a difference between the corrected temperature set point $T\_set\_corr$ and the temperature $T\_uit\_afsch$ of the compressed gas downstream of the oil separator in such a way that the temperature $T\_uit\_afsch$ of the compressed gas downstream of the oil separator is higher than said dew point.

The principle of feed-forward is well known, and is on the basis of information or knowledge known in advance in the system to control the process at a subsequent time.

In another practical form of embodiment, the control unit comprises a master controller and a slave controller, wherein the master controller determines a corrected temperature set point $T\_set\_corr$ for the slave controller on the basis of the dew point and the temperature $T\_uit\_afsch$ the compressed gas downstream of the oil separator, which will control the cooling means on the basis of this corrected temperature set point $T\_set\_corr$ and the temperature $T\_uit$ of the compressed gas at the outlet, in such as way that the temperature $T\_uit\_afsch$ of the compressed gas downstream of the oil separator is higher than the said dew point.

The principle of master-slave control is also well known, and in this case the master controller will form a large, slow control loop and the slave controller a small, fast correction to this.

With the aid of a feed-forward or master-slave control, one can control the temperature $T\_uit\_afsch$ of the compressed gas downstream of the oil separator by also taking the temperature $T\_uit$ of the compressed gas at the outlet into account, i.e. using it upon a correction.

The invention also relates to a method for controlling a compressor device according to the invention, characterized in that the method comprises the following steps:

A—determining or measuring a temperature T_uit of the compressed gas at the outlet and a temperature T_uit_afsch of the compressed gas downstream of the oil separator;

B—determining a dew point of the compressed gas;

C—controlling said cooling means on the basis of the temperature T_uit of the compressed gas at the outlet, the temperature T_uit_afsch of the compressed gas downstream of the oil separator and the dew point.

It goes without saying that the advantages of such a method are the same as those of the compressor device.

In a practical embodiment, the method comprises the step of calculating a corrected temperature set point T_set_corr on the basis of the temperature T_uit of the compressed gas at the outlet and the dew point of the compressed gas, wherein the method subsequently comprises the step of controlling the cooling means on the basis of a difference between the corrected temperature set point T_set_corr and the temperature T_uit_afsch of the compressed gas downstream of the oil separator, in such a way that the temperature T_uit_afsch of the compressed gas downstream of the oil separator is higher than said dew point.

In an alternative practical embodiment, the method comprises the step of determining a corrected temperature set point T_set_corr on the basis of the dew point and the temperature T_uit_afsch of the compressed gas downstream of the oil separator, wherein the method subsequently comprises the step of controlling the cooling means on the basis of this corrected temperature set point T_set_corr and the temperature T_uit of the compressed gas at the outlet, in such a way that the temperature T_uit_afsch of the compressed gas downstream of the oil separator is higher than said dew point.

For said cooling means, a controlled mixing valve is preferably used which is provided with either an input and two outputs, the mixing valve being incorporated in the injection line upstream of a cooler incorporated in the injection line which can be bypassed by means of a bypass line, in such a way that the input and a said output connect to the injection line and the other output connects to the bypass line;

or two inputs and one output, the mixing valve being incorporated in the injection line downstream of said cooler in such a way that one of the two inputs and the output connect to the injection line and the other input to the bypass line.

For said cooling means, a controllable cooler disposed in said injection line is preferably used.

Figure 2:
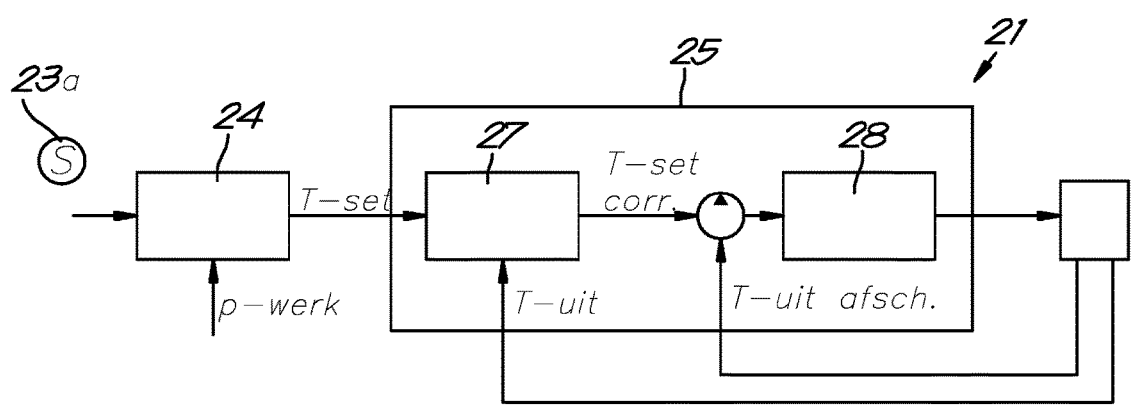
Figure 3:
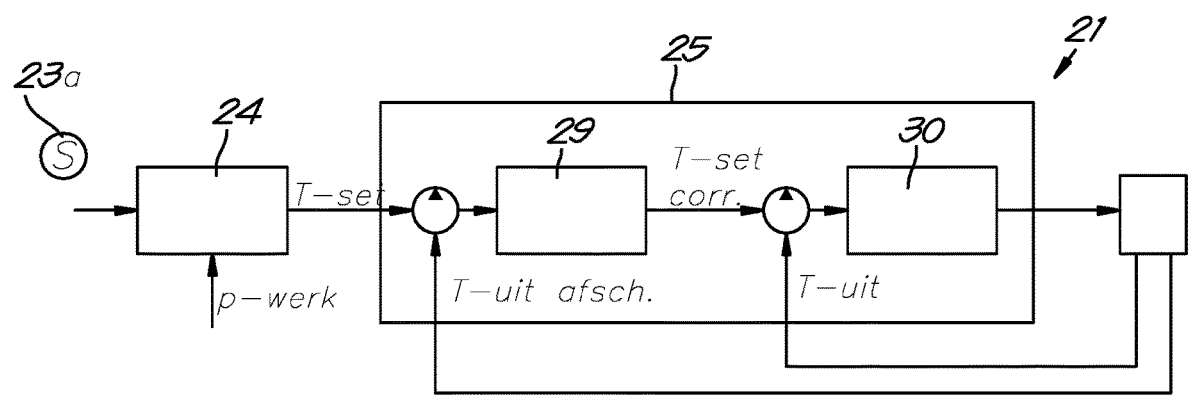

To better demonstrate the characteristics of the invention, a number of preferred variants of a compressor device and method in accordance with the invention are described below, by way of example without any restrictive character, and with reference to the accompanying drawings, in which:

FIG. 1 schematically shows a compressor device in accordance with the invention;

FIGS. 2 and 3 show two possible control diagrams.

The compressor device 1 shown schematically in FIG. 1 comprises an oil-injected compressor element 2 which has an inlet 3 for gas to be compressed and an outlet 4 for compressed gas.

The compressor element 2 is provided with a drive 5.

The inlet 3 is provided with an inlet line 6 having an inlet filter 7.

The outlet 4 connects to an oil separator 9 via an outlet line 8.

The oil separator 9 is in turn connected to the compressor element 2 by means of an injection line 10, in order to be able to inject the separated oil.

In the illustrated example, this connection is made via the drive 5 which connects to the injection line 10 for injecting oil into the drive 5.

It is clear that the injection line 10 may also connect to the compressor element 2 itself to provide a direct connection to the oil separator 9 rather than via the drive 5.

A pressure line 11 is also connected to the oil separator 9 in order to discharge purified gas. This pressure line 11 successively includes: an oil filter 12 to separate the last remaining oil in the compressed gas, and a cooler 13 to cool the compressed gas before it is transported to consumers of compressed gas or a pressure network.

The oil filter 12 connects to the compressor element 2 via an oil line 14 to be able to inject the oil separated by the oil filter 12.

Furthermore, the compressor device 1 is provided with controllable cooling means 15 for the oil.

In this case, they are implemented in the following manner:

In the said injection line 10, a cooler 16 is provided which can be bypassed by means of a bypass line 17, said controllable cooling means 15 being formed by a controlled mixing valve 18 provided with an input 19 and two outputs 20a, 20b, the mixing valve 18 being incorporated in the injection line 10 upstream of the said cooler 16, in such a way that the input 19 and one of the two outputs 20a connects to the injection line 10 and the other output 20b connects to the bypass line 17.

It should be clear that, by controlling the mixing valve 18, the amount of oil which passes via the cooler 16 can be controlled and in this way the degree to which the oil is cooled can be controlled, or in other words, the temperature of the oil can be controlled.

The cooler 16 can take various forms, for example an oil-air heat exchanger provided with a cooling fan or an oil-water heat exchanger.

Said controllable cooling means 15 may alternatively be formed by a controlled mixing valve 18 provided with two inputs and an output, the mixing valve 18 being incorporated in the injection line 10 downstream of said cooler 16, in such a way that one of the two inputs and the output connect to the injection line 10 and the other input connects to the bypass line 17.

To control these controllable cooling means 15, the compressor device 1 is provided with a control unit 21.

The control unit 21 is connected to a number of measuring means 22a, 22b.

These measuring means 22a, 22b according to the invention comprise at least:

means 22a disposed at the outlet 4 to measure or determine the temperature T_uit of the compressed gas at the outlet 4, a temperature sensor 22b to determine the temperature T_uit_afsch of the compressed gas downstream of the oil separator 9.

In this case, the means 22a are a temperature sensor, but it is not excluded that these means 22a comprise a pressure sensor.

In this case, the second temperature sensor 22b is disposed downstream of the oil filter 12.

Furthermore, additional sensors 23a, 23b are provided, which are also connected to the control unit 21:

inlet condition sensors 23a, represented in the figure by the sensor S, a pressure sensor 23b disposed in the oil separator 9 which determines or measures the working pressure p_werk in the oil separator.

The inlet condition sensors 23a measure or determine pressure, temperature and humidity at the inlet 3.

As will be clarified later, the inlet condition sensors 23a and this pressure sensor 23b are used to determine a dew point at the outlet 4. However, these additional sensors 23a, 23b are optional and it is not excluded that the dew point is determined by an estimation.

To determine the dew point, the control unit 21 is provided with a separate computational unit 24.

By "connected to the control unit 21" is meant that the measuring means 22a, 22b concerned or additional sensors 23a, 23b transmit their signal, i.e. the temperature, pressure, etc. which they have recorded, to the control unit 21.

Furthermore, the control unit 21 is provided with a controller 25.

This controller 25 includes one or more PID or PD controllers.

Of course, it is not excluded that the controller 25 may include one or more fuzzy controllers instead of PID or PD controllers.

Said controller 25 will control the cooling means 15 on the basis of signals from said means 22a and the temperature sensor 22b, and on the basis of the dew point at the outlet 4.

Furthermore, the oil separator 9 and said oil filter 12 are disposed in a sealed, insulated housing 26.

The operation of the compressor device 1 and the method for controlling the compressor device 1 is very simple and as follows.

During operation of the compressor device, the compressor element 2 will compress gas which is sucked in via the inlet filter 7.

Via the injection line 10 and the oil line 14, oil is injected into the compressor element 2 and the drive 5 for the cooling and lubrication thereof.

The compressed gas will leave the compressor element 2 via the outlet 4.

This compressed gas also contains oil.

Via the outlet line 8, this gas-oil mixture will arrive in the oil separator 9, where the oil will be largely separated from the compressed gas.

Thereafter, the compressed gas yet passes via an oil filter 12, where the last oil is separated, and via a cooler 13, before being sent to a pressure network or users of compressed gas.

The oil separated in the oil separator 9 is injected back into the compressor element 2 via the injection line 10 and bypass line 17, this oil first passing via the drive 5 before arriving in the compressor element 2.

The oil separated in the oil filter 12 is injected back into the compressor element 2 via the oil line 14, for example at the level of the bearings.

The control unit 21 will control the mixing valve 18 during operation of the compressor device 1 to control the temperature of the injected oil by determining how much oil passes via the cooler 16 to be cooled.

So doing, it will be controlled in such a way that the temperature of the compressed gas downstream of the oil separator 9, and in this case also downstream of the oil filter 12, is high enough to avoid the occurrence of condensate. In practical terms, this means that this temperature of the compressed gas must lie above the dew point.

The control applied here is on the basis of the signals from said means 22a and the temperature sensor 22b and on the basis of the dew point at the outlet 4.

In the example shown, the dew point is determined by the control unit 21 with the aid of the computational unit 24 on the basis of signals from the inlet condition sensors 23a and the pressure sensor 23b.

The output of the computational unit 24 is a temperature set point T_set on the basis of the dew point.

The controller 25 may then be implemented in two different ways, which are schematically shown in FIGS. 2 and 3.

FIG. 2 shows a controller 25 having a feed-forward principle.

The control unit 21 comprises a feed-forward control 27 which will calculate a corrected temperature set point T_set_corr on the basis of the temperature T_uit of the compressed gas at the outlet 4 and the dew point, which is used by a controller 28 to appropriately control the cooling means 15 on the basis of the difference between the corrected temperature set point T_set_corr and the temperature T_uit_afsch of the compressed gas downstream of the oil separator 9.

FIG. 3 shows a controller 25 having a master-slave principle.

The control unit 21 comprises a master controller 29 and a slave controller 30, the master controller 29 determining, on the basis of the dew point and the temperature T_uit_afsch of the compressed gas downstream of the oil separator, a corrected temperature set point T_set_corr for the slave controller 30, which will appropriately control the cooling means 15 on the basis of this corrected temperature set point T_set_corr and the temperature T_uit of the compressed gas at the outlet 4.

The advantage of the insulated housing 26 containing the oil separator 9 and the oil filter 12 is that the temperature difference between T_uit and T_uit_afsch is minimized, making both said control principles much more stable and accurate.

Optionally, means may be provided in this housing 26 to control the temperature of the housing 26.

Although in the previous example the controllable cooling means 15 were formed by an controllable mixing valve 18, they can be implemented in various ways.

The cooling means 15 may also be formed by a controllable cooler disposed in said injection line 10.

The controllable cooler is then controlled by the control unit 21, the cooling capacity being adjustable, for example, by controlling a speed of a cooling fan at an air-oil cooler or by controlling the temperature or a flow rate of cooling water in the case of a water-oil cooler.

Said controllable cooler may optionally be bypassed by means of a bypass line 17, in which case a thermostat is provided with an input and two outputs, the thermostat connecting with its input and one of the two outputs to the injection line 10 and connecting with the other output to the bypass line 17.

This thermostat would then be a passive element.

The operation of such compressor device 1 with a controllable cooler is further identical to the operation of the compressor device described above in FIG. 1.

This invention is by no means limited to the embodiments described by way of example and shown in the figures, but such a compressor device and method according to the invention can be realized in different variants without departing from the scope of the invention.

The invention claimed is:
1. A compressor device comprising an oil-injected compressor element (2) having an inlet (3) for gas to be compressed and an outlet (4) for compressed gas, wherein the outlet (4) is connected via an outlet line (8) to an oil separator (9) connected by an injection line (10) to said compressor element (2) for an injection of oil, wherein controllable cooling means (15) for the oil are provided, the compressor device (1) further being provided with a control unit (21) and thereto connected measuring means (22a, 22b) for controlling the cooling means (15) to control a temperature (T_uit_afsch) of the compressed gas downstream of the oil separator (9), wherein the measuring means (22a, 22b) include means (22a) for determining a temperature (T_uit) of the compressed gas at the outlet (4) and a temperature sensor (22b) for determining the temperature (T_uit_afsch) of the compressed gas downstream of the oil separator (9), the control unit (21) containing a controller (25) for controlling the cooling means (15) on the basis of signals from said means (22a) and the temperature sensor (22b) and on the basis of a dew point of the compressed gas; and that the controller (25) of the control unit (21) comprises
 a feed-forward control (27) which will calculate a corrected temperature set point (T_set_corr) on the basis of the temperature (T_uit) and the dew point of the compressed gas, which is used by a controller (28) to control the cooling means (15) on the basis of a difference between the corrected temperature set point (T_set_corr) and the temperature (T_uit_afsch) of the compressed gas downstream of the oil separator (9), in such a way that the temperature (T_uit_afsch) of the compressed gas downstream of the oil separator (9) is higher than said dew point; or
 a master controller (29) and a slave controller (30), wherein the master controller (29) determines a corrected temperature set point (T_set_corr) for the slave controller (30) on the basis of the dew point and the temperature (T_uit_afsch) of the compressed gas downstream of the oil separator (9), which will control the cooling means (15) on the basis of this corrected temperature set point (T_set_corr) and the temperature (T_uit) of the compressed gas at the outlet (4), in such a way that the temperature (T_uit_afsch) of the compressed gas downstream of the oil separator (9) is higher than said dew point.

2. The compressor device according to claim 1, wherein in said injection line (10) a cooler (16) is disposed which can be bypassed by means of a bypass line (17), said cooling means (15) being formed by a controlled mixing valve (18) provided with:
 either an input (19) and two outputs (20a, 20b), the mixing valve (18) being incorporated in the injection line (10) upstream of said cooler (16), in such a way that the input (19) and a said output (20a) connect to the injection line (10) and the other output (20b) connects to the bypass line (17);
 or two inputs and an output, the mixing valve (18) being incorporated in the injection line (10) downstream of said cooler (16), in such a way that one of the two inputs and the output connect to the injection line (10) and the other input connects to the bypass line (17).

3. The compressor device according to claim 1, wherein said cooling means (15) are formed by a controllable cooler disposed in said injection line (10).

4. The compressor device according to claim 3, wherein said controllable cooler can be bypassed by means of a bypass line (17), wherein there is provided a thermostat provided with an input and two outputs, the thermostat connecting with its input and one of the two outputs to the injection line (10) and connecting with the other output to the bypass line (17).

5. The compressor device according to claim 1, wherein the controller (25) comprises a PID controller and/or a PD controller.

6. The compressor device according to claim 1, wherein the controller (25) comprises a fuzzy controller.

7. The compressor device according to claim 1, wherein the compressor device (1) is further provided with inlet condition sensors (23a), which are connected to the control unit (21), and a pressure sensor (23b) which is connected to the control unit (21) and which determines a pressure (p_werk) in the oil separator (9), wherein the control unit (21) is able to determine the dew point at the outlet (4) on the basis of signals from the inlet conditions sensors (23a) and the pressure sensor (23b).

8. The compressor device according to claim 1, wherein the oil separator (9) and any oil filter (12) downstream of the oil separator (9) are disposed in a sealed insulated housing (26).

9. The compressor device according to claim 1, wherein the means (22a) for determining the temperature (T_uit) of the compressed gas at the outlet (4) comprise a temperature sensor or a pressure sensor capable of determining a pressure at the outlet (4).

10. A method for controlling a compressor device (1) comprising an oil-injected compressor element (2) with an inlet (3) for gas to be compressed and an outlet (4) for compressed gas wherein the outlet (4) is connected via an outlet line (8) to an oil separator (9) which is connected by means of an injection line (10) to said compressor element (2) for an oil injection, wherein controllable cooling means (15) for the oil are provided, wherein the method comprises the following steps:
 A—determining or measuring a temperature (T_uit) of the compressed gas at the outlet (4) and a temperature (T_uit_afsch) of the compressed gas downstream of the oil separator (9);
 B—determining a dew point of the compressed gas;
 C—controlling said cooling means (15) on the basis of the temperature (T_uit) of the compressed gas at the outlet (4), the temperature (T_uit_afsch) of the compressed gas downstream of the oil separator (9) and the dew point;
 D—calculating a corrected temperature set point (T_set_corr) on the basis of the temperature (T_uit) of the compressed gas at the outlet (4) and the dew point of the compressed gas, wherein the method subsequently comprises the step of controlling the cooling means (15) on the basis of a difference between the corrected temperature set point (T_set_corr) and the temperature (T_uit_afsch) of the compressed gas downstream of the oil separator (9), in such a way that the temperature (T_uit_afsch) of the compressed gas downstream of the oil separator (9) is higher than said dew point; or
 determining a corrected temperature set point (T_set_corr) on the basis of the dew point and the temperature (T_uit_afsch) of the compressed gas downstream of the oil separator (9), the method subsequently comprising the step of controlling the cooling means (15) on the basis of this corrected temperature set point (T_set_corr) and the temperature (T_uit) of the compressed gas at the outlet (4), in such a way that the temperature (T_uit_afsch) of the compressed gas downstream of the oil separator (9) is higher than said dew point.

11. The method according to claim 10, wherein for said cooling means (15) a controlled mixing valve (18) is used which is provided with
- either an input (19) and two outputs (20a, 20b), the mixing valve (18) being incorporated in the injection line (10) upstream of a cooler (16) incorporated in the injection line (10) which can be bypassed by means of a bypass line (17), in such a way that the input (19) and a said output (20a) connect to the injection line (10) and the other output (20b) connects to the bypass line (17);
- or two inputs and an output, the mixing valve (18) being incorporated in the injection line (10) downstream of said cooler (16) in such a way that one of the two inputs and the output connect to the injection line (10) and the other input connects to the bypass line (17).

12. The method according to claim 10, wherein for said cooling means (15) a controllable cooler is used which is disposed in said injection line (10).

* * * * *